(12) United States Patent
Bäumler

(10) Patent No.: US 8,022,334 B2
(45) Date of Patent: Sep. 20, 2011

(54) HEATABLE GLASS PANE

(76) Inventor: Peter Bäumler, Aachen (DE)

( * ) Notice: Subject to any disclaimer, the term of this patent is extended or adjusted under 35 U.S.C. 154(b) by 498 days.

(21) Appl. No.: 10/581,185

(22) PCT Filed: Nov. 24, 2004

(86) PCT No.: PCT/DE2004/002594
§ 371 (c)(1),
(2), (4) Date: Jul. 9, 2008

(87) PCT Pub. No.: WO2005/055667
PCT Pub. Date: Jun. 16, 2005

(65) Prior Publication Data
US 2009/0014426 A1    Jan. 15, 2009

(30) Foreign Application Priority Data
Dec. 1, 2003    (DE) .................................. 103 56 607

(51) Int. Cl.
*B60L 1/02*    (2006.01)
(52) U.S. Cl. .......................... 219/203; 219/522; 219/541
(58) Field of Classification Search .................. 219/203, 219/522, 202, 211, 212, 543, 544, 547, 549; 338/211, 217, 306–314, 322
See application file for complete search history.

(56) References Cited

U.S. PATENT DOCUMENTS

| | | | |
|---|---|---|---|
| 2,878,357 A | 3/1959 | Thomson et al. | |
| 3,414,713 A | 12/1968 | Reifeiss et al. | |
| 5,347,106 A | 9/1994 | Reiser et al. | |
| 5,877,727 A * | 3/1999 | Saitou et al. | 343/713 |
| 6,011,244 A | 1/2000 | Castle et al. | |
| 6,914,224 B2 | 7/2005 | Gillner et al. | |

FOREIGN PATENT DOCUMENTS

| | | |
|---|---|---|
| DE | 7327878 U | 7/1973 |
| DE | 150979 A | 9/1981 |
| DE | 29606071 U1 * | 6/1996 |
| DE | 29606071 U1 | 7/1996 |
| DE | 10126869 A1 | 12/2002 |
| EP | 0788294 A2 | 8/1997 |
| WO | WO 03/105533 A1 | 12/2003 |

* cited by examiner

*Primary Examiner* — Geoffrey S Evans
*Assistant Examiner* — Vinod D Patel
(74) *Attorney, Agent, or Firm* — David C. Purdue

(57) ABSTRACT

A heatable glass pane is disclosed. The glass pane includes two bus bars which are located parallel to a base edge of the glass pane and arranged essentially in a line in their axial direction, spaced apart a short distance from one another. The glass pane includes a set of heating wires which are in electrical contact with the two contact busbars and the heating wires have essentially the same lengths.

4 Claims, 2 Drawing Sheets

HEATABLE GLASS PANE

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a heatable glass pane, comprising two contact bus bars of different polarity, which are arranged essentially parallel to one another in their longitudinal direction and parallel to a base edge of the heatable glass pane, and a set of heating wires, which are in electrical contact with the contact bus bars.

2. Description of Related Art

Such a glass pane has been disclosed in DE 101 26 869 A1. Therein, an electrically heatable pane is disclosed, in which the mutually parallel contact bus bars are arranged at different distances from the base edge and thus one on top of the other, when viewed transversely with respect to their longitudinal direction. The heating wire is guided, starting from the upper contact bus bar, in a plurality of loops and then beyond the upper contact bus bar to the lower contact bus bar, the heating wire being electrically insulated with respect to the upper contact bus bar at the point of intersection with said upper contact bus bar. The arrangement of the two contact bus bars on the same pane edge is particularly advantageous for side windowpanes of motor vehicles, since a contact bus bar at any other edge would be visually disruptive. In addition, the base edge lies within a doorframe, which makes power supply easier, in particular if a window winding motor is already present. The disclosure also includes guiding the heating wire in the region of a slope of the side windowpane, i.e. where the pane has not yet reached its maximum height extent, in a greater number of loops (for example with five changes in direction) than in the region of the greatest pane height (for example three changes in direction). This is intended to achieve a situation in which the lengths of the laid heating wires are the same, as far as possible, in order to achieve corresponding resistance values. However, one disadvantage of the described manner of laying the heating wires is that only a very rough variation of the heating wire length is possible. When the heating wire reaches the region of the contact bus bars, the decision remains as to whether to make contact with the contact bus bars or to carry out a further two changes in direction, which then means an increase in the heating wire lengths by almost two complete heights of the pane at this point. It is thus barely possible to achieve a situation in which the heating wire lengths are actually to a large extent exactly the same. In addition, it is technically complex to guide the heating wire with insulation over the upper contact bus bar to the lower contact bus bar.

DE 296 06 071 U1 has disclosed a heatable glass pane, in which parallel-connected, electrical heating wires, which are embedded in a thermoplastic intermediate layer, are provided only in the region of the window wiper rest position. In this case, contact bus bars have been disclosed which have only relatively small dimensions on the pane and therefore also only permit a correspondingly limited number of heating wires for contact-making purposes. The heating wires are guided in each case one loop, the heating wires, which are guided in the outermost loop, being essentially longer than the innermost wires. The limited extent of the contact bus bars and thus the limited number of heating wires which can be used allows for an expedient heating field only in a lower subregion of the glass pane.

BRIEF SUMMARY OF THE INVENTION

It is now the object of the present invention to make available a heatable glass pane of the type mentioned initially, with which effective heating with largely uniform heating power density over the entire window surface is possible in an improved manner by means of heating wires even when the contact bus bars are arranged at the base edge of the pane alone.

This object is achieved in the case of a glass pane of the type mentioned initially by the fact that the contact bus bars are arranged essentially in a line in their longitudinal direction, and the heating wires have essentially the same length as one another.

The arrangement of the contact bus bar in a line means that points of intersection between the heating wire and the contact bus bars are avoided. With corresponding heating wire lengths, a uniform distribution of the heating energy over the glass pane surface can be achieved.

The glass pane according to the invention may advantageously also be designed such that the heating wires are laid without any points of intersection in relation to one another, one of the heating wires, as the outermost heating wire, making contact with the contact bus bars at their outer ends facing away from one another, and at least each inner heating wire being laid with at least one compensation loop in order to achieve the same heating wire lengths. The compensation loops can easily be dimensioned such that the length of the associated heating wire precisely corresponds to the length of the next-outer heating wire.

It may also be expedient in this case for the outermost heating wire to be laid with a compensation loop. For instance, a length of the outermost heating wire which cannot be laid without a compensation loop could be necessary to achieve a specific resistance value. Furthermore, the compensation loop in the outermost heating wire involves a further possible variant, which makes it easier to equip the glass pane completely and uniformly with heating wires of the same length.

It may be advantageous to design the glass pane according to the invention such that the compensation loops are produced by at least two changes in direction of the laying direction, the heating wires after each change in direction extending essentially in the opposite direction and parallel to the laying direction before the change in direction.

Furthermore, the glass pane according to the invention may be designed such that the heating wires have straight laid sections between the changes in direction, these sections being essentially parallel to a side edge adjacent to the base edge.

Alternatively, however, the compensation loops may also be aligned parallel to the upper edge opposite the base edge. In the case of a curved upper edge, the laid sections extending between the changes in direction would have a corresponding curvature. In this case, the first change in direction for the compensation loop of the outermost heating wire can be arranged directly before the adjacent side edge.

However, it may also be advantageous to design the glass pane according to the invention such that at least one partial section of at least one of the heating wires is laid down in undulating fashion. An undulating formation of the heating wire opens up an additional possible variant for achieving predetermined lengths of the heating wire to be laid.

In the case of heating wires being laid down in undulating fashion, the term "laying direction" in the claims and the description means a macroscopic main laying direction, which is given by the central line connecting the zero-crossings of the heating wire undulation.

The glass pane according to the invention may also be designed such that at least one of the inner heating wires has a greater amplitude of the heating wire undulation than the next-outer heating wire, at least in subregions of its extent. When using a greater amplitude, the undulation length of the heating wire undulation should generally be kept constant in order to maintain a uniform laying density.

At a greater amplitude, the distance between the central lines of mutually parallel sections of adjacent heating wires also needs to be enlarged in order to avoid a distance between adjacent heating wires which is too small for a uniform distribution of the heating power.

One possible way of varying the amplitude of the undulation is explained in the German Patent Application 103 10 088.1.

The glass pane according to the invention may also be designed such that the heating wires are guided without any points of intersection in relation to one another by a first one of the heating wires, as the outermost heating wire, being connected to the outer ends, which face away from one another, of the contact bus bars, and each inner heating wire having a greater amplitude of the heating wire undulation than the next-outer heating wire, at least in subregions of its extent, in order to achieve the same heating wire lengths. In this case, the heating wire lengths are matched merely using the different amplitudes of the heating wires.

Finally, it may be advantageous to design the glass pane according to the invention such that the heatable glass pane is electrically connected to a heated pane controller, which has at least two heating stages with different heating powers. With two heating power stages, it is possible to respond to different demands in an appropriate manner. If the pane is merely steamed up, it may be sufficient to use a lower heating power to free the glass pane of condensation water and to keep it permanently free from this condensation water. The low power places a correspondingly lower load on the energy source, for example an automobile battery. If higher heating powers are required, for example in the case of an iced-up glass pane, it is necessary to take care, for the purpose of protecting the automobile battery, that the heating power is correspondingly limited temporally.

BRIEF DESCRIPTION OF THE SEVERAL VIEWS OF THE DRAWING

One advantageous embodiment of the glass pane according to the invention will be illustrated below with reference to two figures, in which.

DETAILED DESCRIPTION OF THE INVENTION

Figure 1:
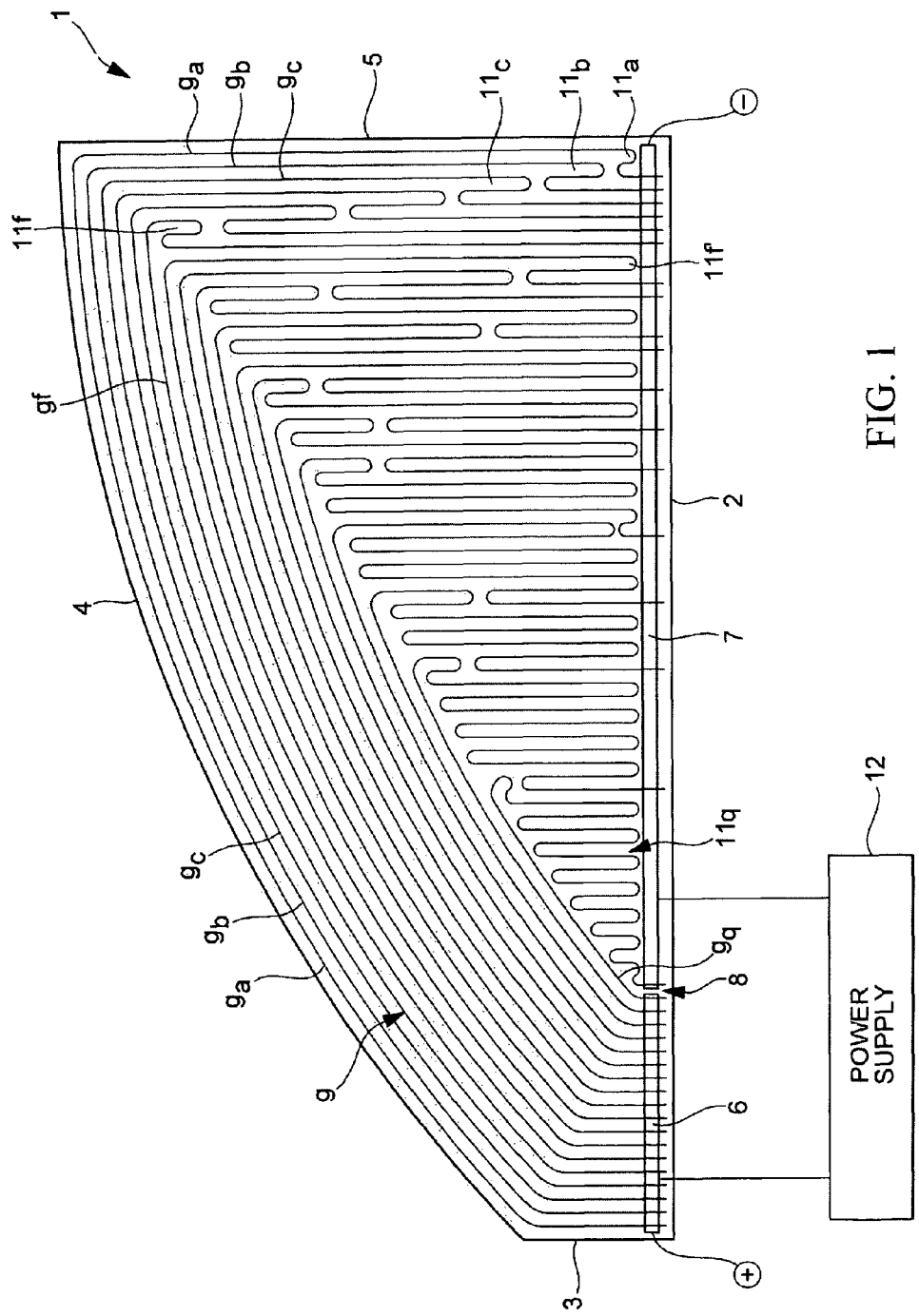
FIG. 1 shows a schematic of a vehicle side windowpane equipped with heating wires.

FIG. 1 shows a vehicle side windowpane 1 having a base edge 2, a front side edge 3, an obliquely extending upper edge 4 and a rear side edge 5. The vehicle side windowpane 1 is illustrated enlarged in FIG. 2 in the region of the rear side edge 5.

The pane is in this case a composite glass pane having a plastic film (not visible here) between two pane elements. Contact bus bars 6, 7 and a set of heating wires 9 have been fitted to the plastic film.

The contact bus bar 6, which is connected to the plus pole of a DC voltage source, represented by a power supply 12, and the contact bus bar 7, which is connected to the minus pole of the DC voltage source, i.e., the power supply 12, are arranged along the lower base edge 2 and are separated from one another by a gap 8.

Figure 2:
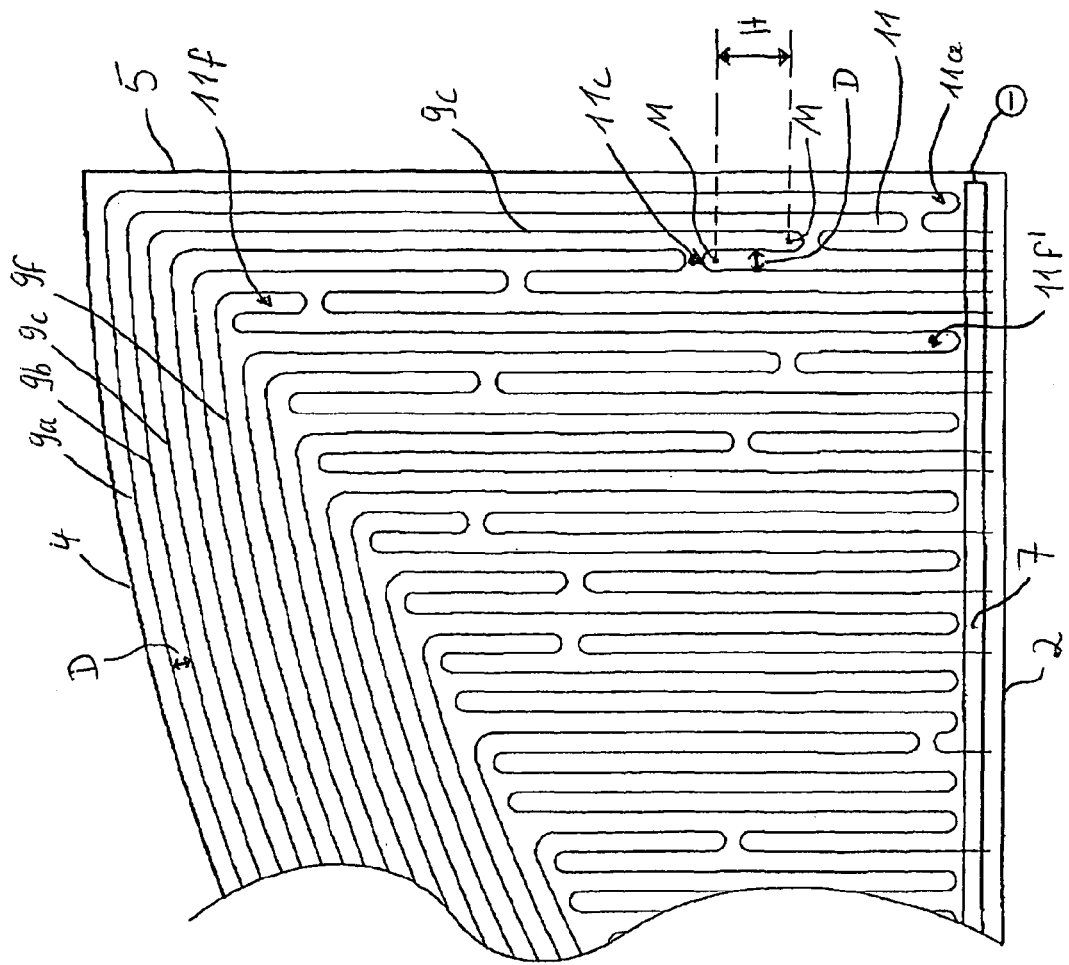
FIG. 2 shows a schematic of an enlarged section of the side windowpane shown in FIG. 1.

At that end of the contact bus bar 6 which faces the front side edge 3, electrical contact is made with an outermost heating wire 9a, which is guided along the front side edge 3, the upper edge 4 and the rear side edge 5 up to the outer end, which faces the rear side edge 5, of the contact bus bar 7, and electrical contact is made between said outermost heating wire 9a and said contact bus bar 7. Adjacent to the outermost heating wire 9a, at a certain distance D, which may be between approximately 0.5 mm and 6 mm depending on the type of heating wire used and the heating power density desired, contact is made with the second outermost heating wire 9b at the contact bus bar 6, and said second outermost heating wire 9b is guided, at the distance D, to a large extent parallel to the outermost heating wire 9 towards the contact bus bar 7. FIGS. 1 and 2 are not to scale. In order to provide an understandable illustration of the invention, in particular a distance D, which is too large in relation to the glass pane 1, has been selected between the heating wires 9 in the figures. In order that each heating wire 9 has largely the same electrical resistance, the heating wires 9 should correspond in terms of their lengths. In order to achieve this, in each case at least one compensation loop 11 is provided in the extent for each heating wire 9.

In order to be able to provide the entire glass pane 1 completely with a uniform heating wire density, the length of the heating wires 9 and the distance D between the heating wires 9 need to be matched to one another, it being necessary to take account of the desired heating power, the wire cross section and the wire material. In order to achieve the optimum heating wire length, a compensation loop 11a is also provided in the outermost heating wire 9a. The compensation loop 11a has two changes in direction, after each change in direction the heating wire 9a extending essentially in the opposite direction and parallel to the laying direction before the change in direction. The length of each of the heating wires 9, shown in FIG. 1, is essentially the same.

The second outermost heating wire 9b likewise has a compensation loop 11b, whose first change in direction in FIGS. 1 and 2 is located precisely above the location of the second change in direction of the compensation loop 11a of the outermost heating wire 9a. The compensation loop 11c of the third outermost heating wire 9c is correspondingly arranged above the compensation loop 11b of the second outermost heating wire 9b. The procedure is continued in this manner for the heating wires 9 lying further inwards.

The additional length ΔL achieved by the compensation loops 11 is illustrated using the third outermost heating wire 9c (cf. FIG. 2): The distance D of the straight sections of the compensation loop 11c in relation to one another corresponds to the overall distance D of the heating wires 9 in relation to one another in the regions outside the compensation loops 11, in which they extend parallel to one another. The change in direction takes place in each case essentially in an arc around a center point M. The additional length ΔL achieved by the compensation loop 11c is calculated from $\Delta L = 2 \times H + \pi \times D$, where H is the distance, provided in the vertical in FIG. 2, between the two center points M of the compensation loop 11c. The additional length ΔL is used to compensate for the reduction in length of the extent of the heating wire 9c owing to the course, lying further inwards, with respect to the next-outer heating wire 9b.

The increasing additional length and the decreasing laying height available results in the fact that two or more compensation loops 11 are to be provided in the case of the heating wires 9 lying further inwards. The sixth outermost heating wire 9f is an example of a heating wire 9 having two compensation loops 11f and 11f. The innermost heating wire 9q in the example illustrated has nine compensation loops 11q (cf. FIG. 1).

In the arrangement reproduced in FIGS. 1 and 2, it is necessary, owing to the compensation loops 11, to form the contact bus bar 7 with a greater length than the contact bus bar 6, the ratio being approximately 3.5:1 in the example illustrated.

The heating wires 9 can be laid down in a straight line or in undulating fashion, the amplitudes of the undulations typically having the order of magnitude of mm. In the case of undulating heating wires 9 (not illustrated in the figures), the amplitude of the undulation from heating wire 9 to heating wire 9 or else in the course of one and the same heating wire 9 may vary in order to have, as a result, an additional variable for setting the desired heating wire length. An undulation may also be expedient for the outermost heating wire 9a.

It is possible to calculate, using a suitable CAD program, a suitable heating field geometry for each pane shape by inputting the wire number, wire length, possibly a range for the amplitudes of the undulation which can be set and a range for the wire distance D.

For example, tungsten wire having a thickness of merely 8-17 μm may be provided for the heating wires 9, as a result of which a possible visual impairment of the glass panes is kept sufficiently low.

LIST OF REFERENCES

1 Vehicle side windowpane
2 Base edge
3 Front side edge
4 Upper edge
5 Rear side edge
6 Contact bus bar
7 Contact bus bar
8 Gap
9 Heating wires
9a Outermost heating wire
9b Second outermost heating wire
9c Third outermost heating wire
9f Inner heating wire
9q Innermost heating wire
11 Compensation loops
11b Compensation loop of the second outermost heating wire
11c Compensation loop of the third outermost heating wire
11f Compensation loop
11f Compensation loop
11q Compensation loops
12 Power supply
M Center point of the change in direction
H Distance between the center points M
D Distance of the heating wires in relation to one another

The invention claimed is:

1. A heatable glass pane having a base edge and a side edge, said heatable glass pane consisting essentially of
   two contact bus bars for connection to voltage source poles of different polarity, and
   a set of heating wires which are in electrical contact and in physical contact with said two contact bus bars,
   wherein said heating wires have essentially the same lengths,
   wherein said heating wires are laid without any points of overlap in relation to one another,
   wherein said heating wires comprise an outermost heating wire which makes contacts with said contact bus bars at their outer ends, facing away from one another,
   wherein said heating wires further comprise a plurality of inner heating wires,
   wherein said inner heating wires are laid out so that they have at least one compensation loop, the compensation loop creates essentially same length of the heating wire, and
   wherein said bus bars are located parallel to and adjacent to said base edge of the heatable glass pane and said bus bars are arranged essentially in a line in their axial directions, spaced apart a short distance from one another.

2. The heatable glass pane claimed in claim 1 wherein said heating wires are laid so that they have a common, main macroscopic laying direction, wherein said at least one compensation loop is produced by at least two changes in direction of the laying direction, and wherein said heating wires, after each change in direction, extend essentially in the opposite direction and parallel to the laying direction before the change in direction.

3. The heatable glass pane claimed in claim 2, wherein said heating wires have straight laid sections between the changes in direction, and wherein said straight laid sections are essentially parallel to said side edge of said glass pane adjacent to said base edge of said glass pane.

4. A heatable glass pane having a base edge and consisting essentially of two contact bus bars for connection to voltage source poles of different polarity and
   a set of heating wires which are in electrical contact and in physical contact with said two contact bus bars, wherein said heating wires have essentially the same lengths,
   wherein said heating wires comprise an outermost heating wire which makes contacts with said contact bus bars at their outer ends, facing away from one another,
   wherein said heating wires further comprise a plurality of inner heating wires, and wherein said inner heating wires are laid out so that they have at least one compensation loop, the compensation loop creates essentially same length of the heating wire, and
   wherein said bus bars are arranged essentially in a line in their axial directions, spaced apart a short distance from one another, and
   wherein said heating wires are laid without any points of overlap in relation to one another.

* * * * *